Sept. 7, 1948. J. J. BLOOMFIELD 2,448,763
CLUTCH MECHANISM
Filed Dec. 14, 1944 4 Sheets-Sheet 2
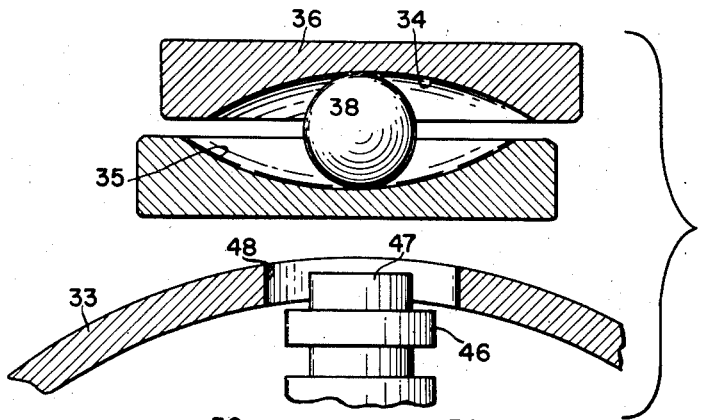
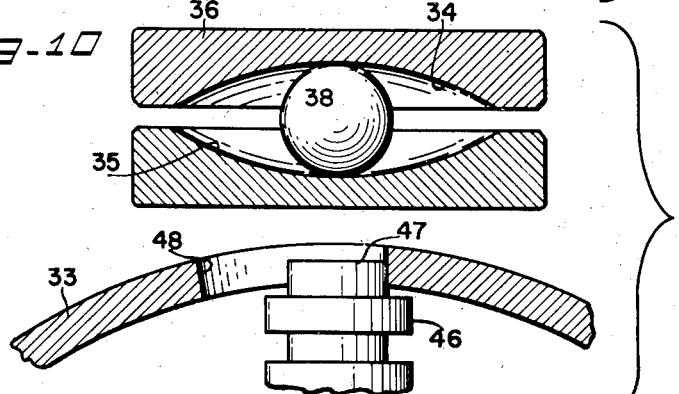
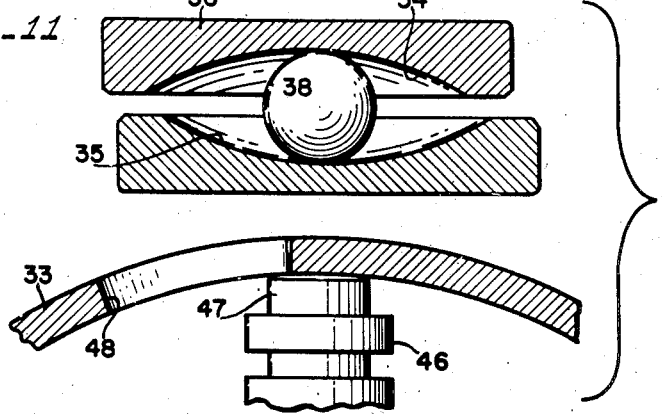
INVENTOR.
JOHN J. BLOOMFIELD
BY
George A. Sullivan
AGENT Sept. 7, 1948.    J. J. BLOOMFIELD    2,448,763
CLUTCH MECHANISM
Filed Dec. 14, 1944    4 Sheets-Sheet 3
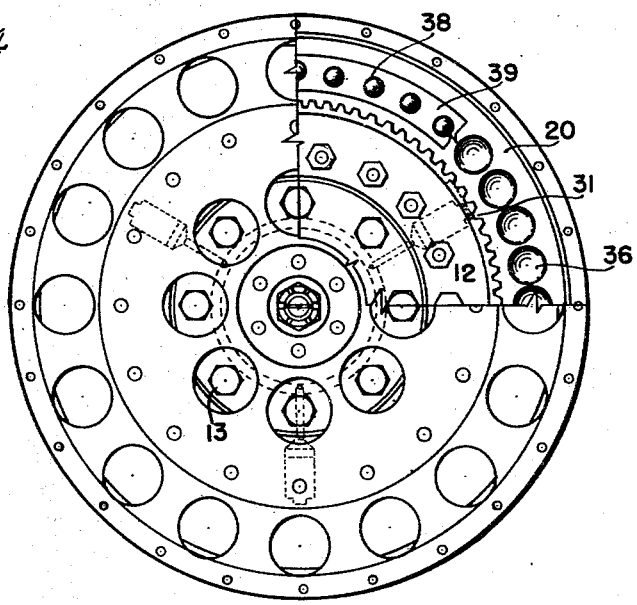
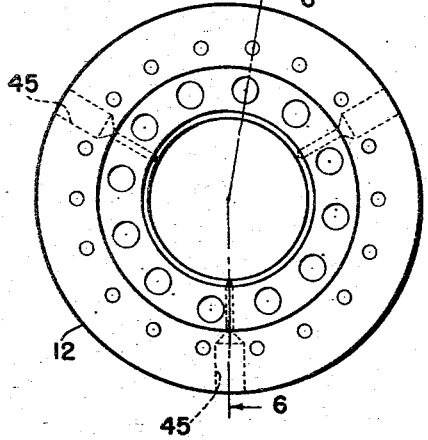
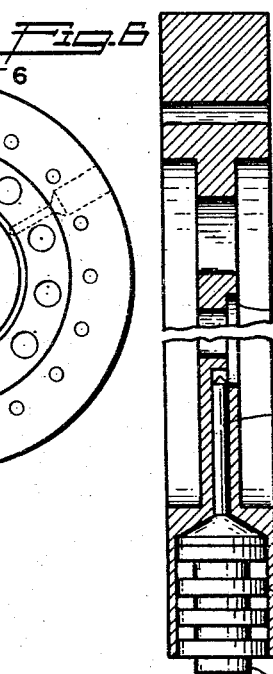
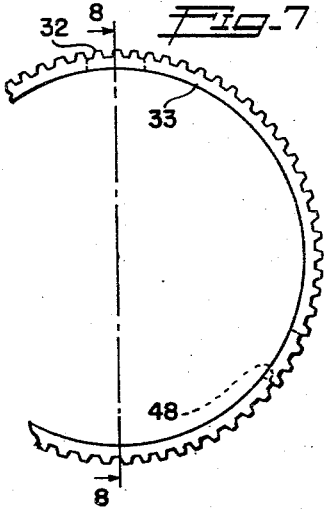
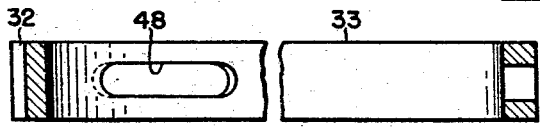
INVENTOR.
JOHN J. BLOOMFIELD
BY
*George C. Sullivan*
AGENT Sept. 7, 1948.     J. J. BLOOMFIELD     2,448,763
CLUTCH MECHANISM
Filed Dec. 14, 1944     4 Sheets-Sheet 4
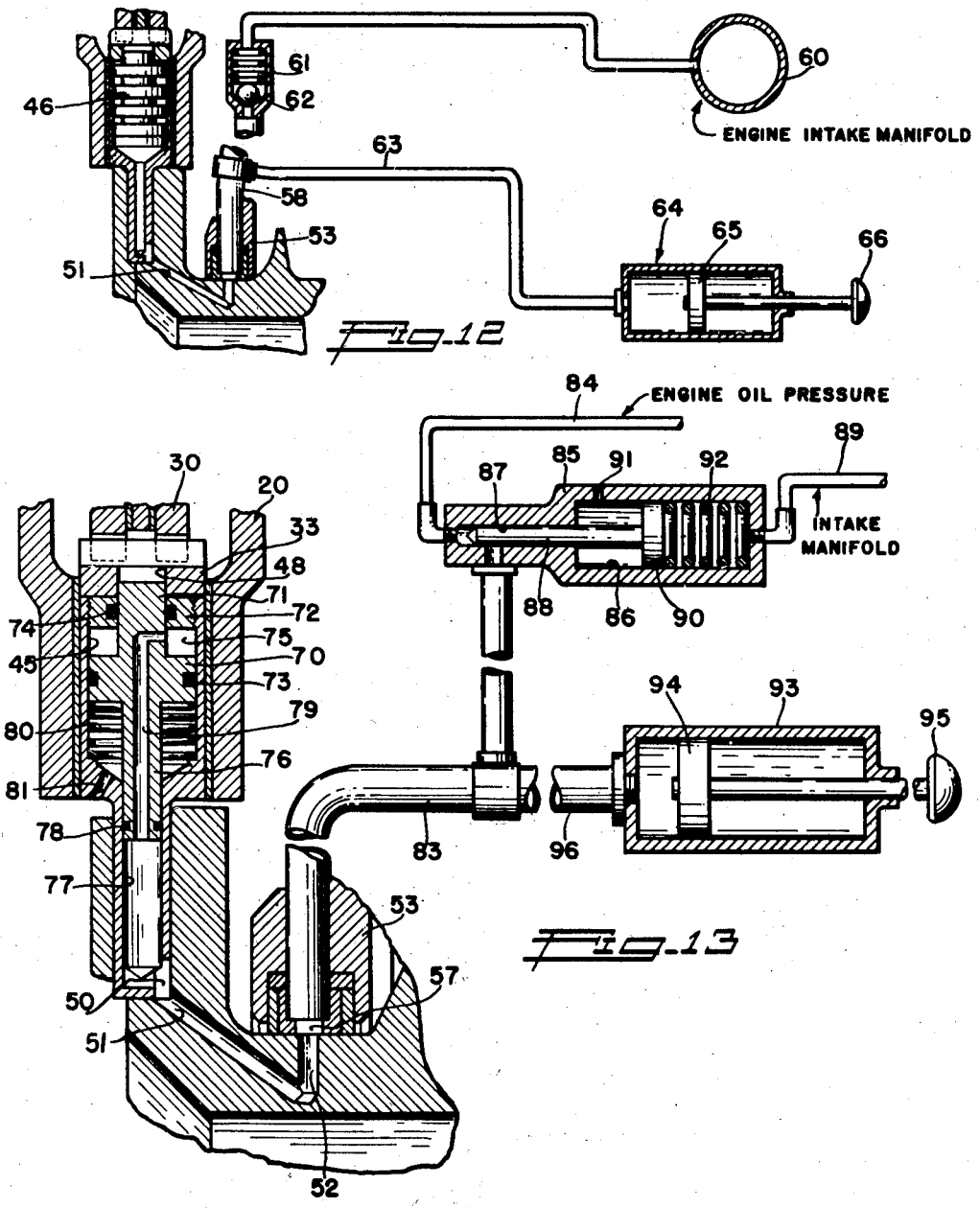
*INVENTOR.*
JOHN J. BLOOMFIELD
BY
*George C. Sullivan*
AGENT Patented Sept. 7, 1948

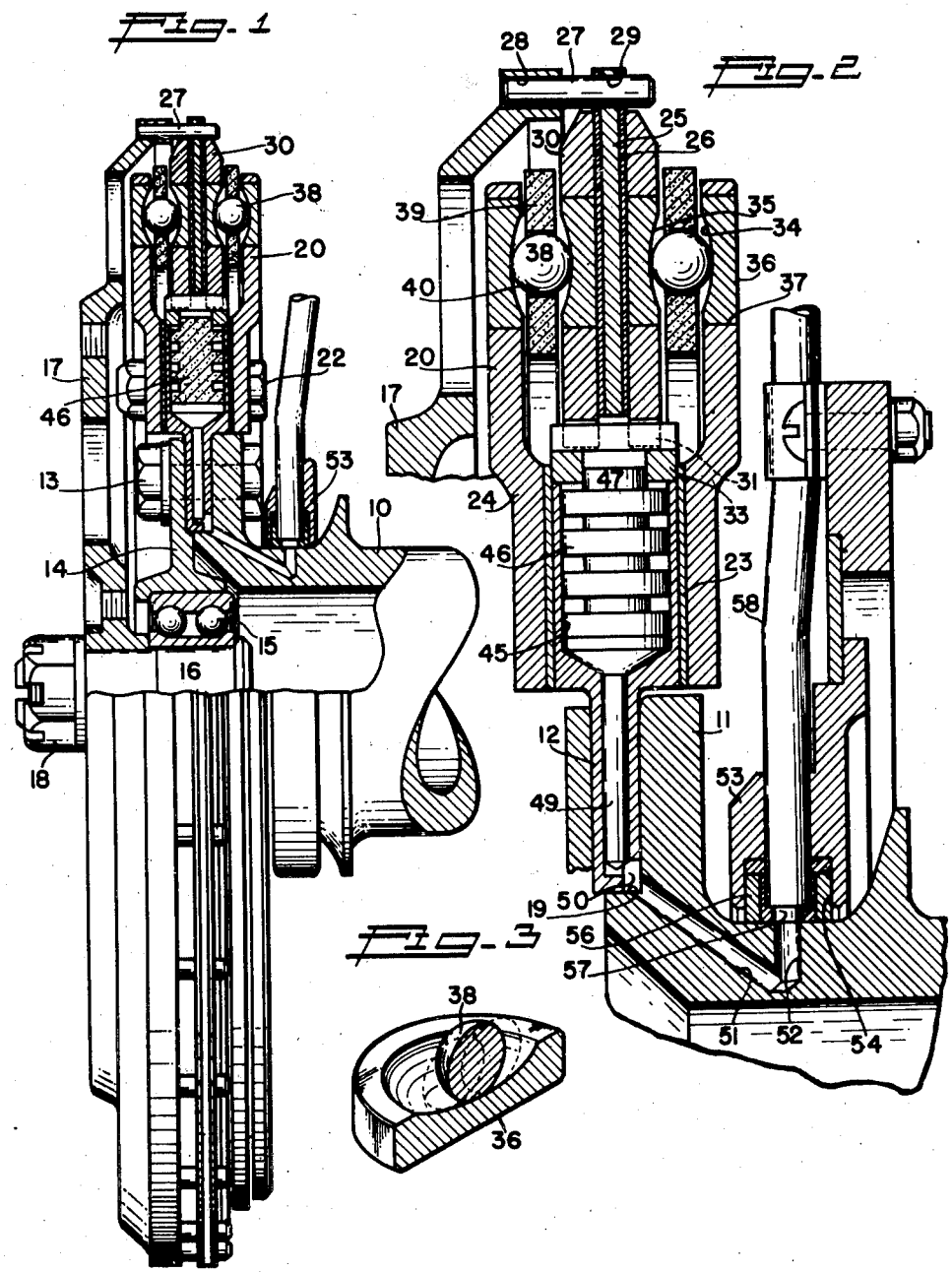

2,448,763

UNITED STATES PATENT OFFICE 2,448,763

CLUTCH MECHANISM

John J. Bloomfield, Burbank, Calif., assignor to Lockheed Aircraft Corporation, Burbank, Calif.

Application December 14, 1944, Serial No. 568,181

22 Claims. (Cl. 192—44)

This invention relates to clutch mechanisms, and relates more particularly to overrunning clutches, normally providing a one-way drive between the driving and driven elements. It is a general object of the invention to provide a simple, compact and inexpensive overrunning clutch embodying controllable means operable to lock up the clutch for the transmission of torque from the normally driven element to the element which normally acts as the driver.

The clutch mechanism of the invention has many applications and is well adapted for use where power is to be transmitted from two or more driving elements to a single driven element. For example, the clutch may be used in aircraft where two or more engines are employed to drive a propeller. In such a situation one or more engines may be utilized to drive the propeller while another engine is shut down so that a free wheeling or overrunning clutch action is required in the clutch of the idle engine, or it may be desired to start one or more of the engines by torque transmitted from another engine that has been previously started in the usual way, in which case a reverse drive is required. After starting the cold engines, an engine may drop out of the drive, or may run unevenly so that the other engine overspeeds, again requiring an overrunning clutch action at the first engine and requiring means for locking up the overrunning clutch to restart the cold engine. The overrunning clutches of the prior art that have included lock-up means for the transmisson of reverse torque are, as a general rule, heavy, complicated mechanisms and therefore not well suited for use in aircraft. Furthermore, in most of such prior art mechanisms, the parts utilized to lock up the clutch also serve to transmit the power between the driving and driven elements so that there is excessive wear of these parts as a result of slippage and the dissipation of energy accompanying each engagement of the clutch.

It is an object of the invention to provide a clutch mechanism of the character above referred to that overcomes the shortcomings and disadvantages of the prior devices of this nature. In my present invention the slippage and energy dissipation occurs at friction surfaces remote from and independent of the lock-up parts, and the latter are not subjected to the wear which is incident to such slippage and energy dissipation.

Another object of the invention is to provide a clutch mechanism of the class referred to that is simple and extremely compact embodying a single friction disc associated with the driven unit and two simple pressure plates associated with the driving element and cooperable with the disc for the transmission of power from one element to the other.

Another object of the invention is to provide a clutch mechanism of the character above referred to that is characterized by a practical, effective means for actuating the pressure plates against the friction disc, said means being actuated by only slight angular displacement between the driving assembly and the pressure plates, and being such that the forces exerted on the pressure plates gradually increase in proportion of the torque transmitted, whereby a smooth clutch action is obtained.

A further object of the invention is to provide a clutch mechanism in which the relative angular displacement between the pressure plates and the driving assembly, essential for the actuation of the pressure plates in order to transmit reverse torque, is normally prevented so that the clutch operates as an overrunning mechanism and a simple fluid pressure means actuated at the will of the operator is operable to free the pressure plates for such relative angular movement so that the clutch may operate to transmit such reverse torque. A single means is available to actuate the pressure plates for the transmission of both normal torque and reverse torque, and this single means is normally prevented from transmitting the reverse torque by a stop means that is retractable at the will of the operator to allow for the transmission of power from the normally driven element to the element which normally constitutes the driver.

A still further object of the invention is to provide a clutch mechanism of the character referred to which automatically slips in the event of overloading of the drive. The above referred to means for operating the pressure plates allows clutch slippage upon such overloading so that the mechanism serves as an "overload clutch" and the overload slippage action is effected without injury to the plate operating means. The clutch mechanism may be adjusted or conditioned to provide for slippage upon subjecting the drive to any given loading.

Other objects and features of the invention will be readily understood from the following detailed description of a typical preferred form of the invention wherein reference will be made to the accompanying drawings in which:

Figure 1 is an edge or side elevation of a clutch mechanism of the invention with the upper portion appearing in longitudinal cross section;

Figure 2 is an enlarged fragmentary longitudinal sectional view of the principal parts of the mechanism;

Figure 3 is an enlarged perspective view of one of the inserts and a ball showing the parts in cross section and indicating the three positions of the ball;

Fig. 4 is a reduced end elevation of the clutch with portions of certain elements broken away to illustrate the internal mechanism;

Figure 5 is a side elevation of the clutch hub;

Figure 6 is a cross section of the hub taken as indicated by line 6—6 on Figure 5;

Figure 7 is a side elevation of the control ring;

Figure 8 is a cross section of the ring taken as inicated by line 8—8 on Figure 7;

Figures 9, 10 and 11 are diagrammatic views illustrating the relative positions of certain clutch parts during normal drive, overrunning and reverse drive conditions respectively;

Figure 12 is a diagrammatic view of a control means for the clutch; and

Figure 13 is a fragmentary sectional view of another form of the invention and the control means therefor.

The proportions, details and designs of the clutch mechanism will vary in different applications of the invention. In the drawings the driving element is in the form of an engine crank shaft 10. The portion of the shaft 10 illustrated is tubular and is provided at its end with a radial flange 11. A clutch hub 12 is arranged against a face of the flange 11 and is secured thereto by circumferentially spaced bolts or screws 13. A bearing support 14 may be attached to the flange 11 by the same bolts 13. A suitable anti-friction bearing 15 within the support 14 carries a stub shaft or pin 16. The pin 16 in turn carries the driven element of the clutch assembly. The driven element is shown to be in the form of a generally flat disc-like flange 17 secured to the pin 16 by a nut 18 threaded on the pin. It is to be observed that in the mechanism thus far described, the clutch hub 12 of the driver and the flange 17 of the driven unit lie in parallel spaced adjacent relation providing for an extremely compact assembly.

The clutch hub 12 is an annular or ring-like member whose internal surface engages an annular shoulder 19 on a face of the crank shaft flange 11. This engagement assures the concentric disposition of the hub on the crank shaft 10. The hub 12 is larger in diameter than the flange 11 to extend beyond the periphery of the flange and the projecting portion of the hub is thickened in the axial direction. This thickened portion of the hub 12 carries two plate actuators 20. The actuators 20 are ring-like plate members secured to the opposite sides of the thickened hub portion by circumferentially spaced bolts 22. The accurate spacing of the actuator plates 20 is important and shims 23 are provided between the surfaces of the hub 11 and the plates. The shims 23 may be adjusted or varied in thickness to condition the clutch to "unload" at a given overloading factor as will be subsequently described. The space between the opposing inner surfaces of the actuators 20 receives the active clutch elements and this space may be increased in width by stepping the actuator plates outwardly at the shoulders 24.

The single friction disc 25 of the clutch is carried by the driven element or flange 17 to be positioned substantially midway between the spaced actuators. The disc 25 is an annular member of steel or the equivalent, having flat parallel side surfaces faced with suitable friction material 26. The periphery of the driven flange 17 is turned in to partially surround the space between the two actuators 20 and may be thickened to have adequate stock for supporting the disc 25. Pins 27 are secured in circumferentially spaced openings 28 in the thickened rim of the driven flange 17 and project axially from the rim. The pins 27 are slidably received in axial openings 29 in the peripheral portion of the friction disc 25. The disc 25, supported by the circumferential series of pins 27, is "free floating" to properly operate between the pressure plates 30 to be later described. The internal surface of the annular friction disc 25 is spaced from the periphery of the clutch hub 11.

A pressure plate 30 is positioned at each side of the friction disc 25 and the two plates are engageable with the friction facings 26 to transmit power between the driving element and the driven element. The thrust or pressure plates 30 are annular members lying in planes parallel with and adjacent to the active faces of the friction disc 25. The peripheral surfaces of the plates 30 clear the disc-supporting pins 27. The plates 30 are supported from their inner margins for independent axial movement relative to the disc 25. The thrust or pressure plates 30 are provided at their inner margins with a series of splines or teeth 31. The teeth 31 of the two plates are preferably identical and in practice may resemble conventional spur gear teeth, although they may take any selected form. Teeth 32 are provided on the periphery of a control member 33 to mesh with the teeth 31. The control member 33 is a ring-like part surrounding the hub 12 and received between the shims 23. The ring or member 33 rides on the periphery of the driving hub 12 to be capable of angular or turning movement with respect thereto. The teeth 32 of the member 33 are considerably wider than the teeth 31 of the thrust plates 30 and may extend throughout the axial extent of the member. The meshing teeth 31 and 32 serve to connect or couple the thrust plates 30 with the member 33 to rotate therewith and the meshing teeth have sliding engagement to allow axial shifting of the plates with respect to the hub.

The invention provides novel and particularly effective means for actuating the thrust or pressure plates 30 against the friction faces of the disc 25 for the transmission of power between the driving and driven elements. These means are made operative upon rotation of the hub 12 relative to the driven flange 17, or upon rotation of the flange with respect to the clutch hub 12. There is an actuating means for each pressure plate 30 and the two means may be identical. The actuating means include annular sets of opposing depressions or recesses 34 and 35 in the actuator plates 20 and the pressure plates 30. To facilitate manufacture and to provide for the formation of the recesses 34 and 35 in material having the desired characteristics, I prefer to form the recesses in inserts 36 secured in openings 37 in the actuator plates 20 and pressure plates 30. Multiplicities of circumferentially spaced openings 37 are provided in the plates 20 and 30. The corresponding openings 37 of the actuators 20 and plates 30 are in axial alignment and in practice the openings may be simple cylindrical bores. The inserts 36 are force fitted or otherwise secured in the openings 37 to be rigidly and permanently fixed to the actuators 20 and pressure plates 30. The inserts 36 preferably have their inner surfaces flush with the inner surfaces of the pressure plates 30 so that they may cooperate with the friction facings 26 of the disc 25.

The depressions or recesses 34 and 35 are formed in the opposing faces of the pairs of aligned inserts 36 and are preferably alike in configuration and proportions. The recesses are of maximum depth at their centers or intermediate portions and gradually diminish in depth in a direction circumferentially of the plates 20 and 30 until their walls merge with the flat faces of the inserts 36. To simplify the manufacture I prefer to give the walls of the recesses 34 and 35 a spherically concave curvature and make the recesses round in face view so that it is unnecessary to index the rotative positions of the inserts when they are installed in their respective plates. The walls of the spherically concave depressions 34 and 35 all have the correct curvature circumferentially of the plates 20 and 30 irrespective of the angular or rotative positions of the inserts 36 in their respective openings 37. It is to be understood that if desired the recesses 34 and 35 may be formed directly in the opposing faces of the actuators 20 and pressure plates 30 and may be elongated circumferentially thereof and formed to gradually diminish in depth from their medial portions to their ends.

The thrust actuating means further includes balls 38 for cooperating with the depressions or recesses 34 and 35. There is a ball 38 for each pair of opposing recesses and the several balls are identical. Owing to the circumferential spacing of the pairs of opposing recesses 35 and 36, there is an annular series of spaced balls 38 between each pair of actuator and thrust plates 20 and 30. A separator ring 39 is provided for each series of balls 38. The rings 39 are arranged between the actuators 20 and pressure plates 30 and have axial openings 40 carrying the balls 38. The ball retaining rings 39 may be constructed of micarta or any other appropriate material and are proportioned so they never at any time engage either the actuators 20 or the pressure plates 30. It will be apparent how the separator rings 39 maintain the balls 38 in their proper spaced relation and facilitate the assembling of the clutch.

Assuming that the drive shaft 10 is rotated, and that the driven flange 17 as yet remains stationary, the actuator plates 20 being secured to the clutch hub 12 rotate with the shaft. The pressure plates 30 tend to rotate with the actuator plates and hub by reason of the engagement of the toothed control member 33 with the periphery of the hub and the engagement of the balls 38 in their recesses 34 and 35. However, the inertia of the plates 30 and the slight incidental engagement of the plates with the friction facings 26 of the disc 25 cause the pressure plates to lag with respect to the actuators 20. This lagging of the pressure plates 30 causes the recesses 34 to move out of true alignment with their respective recesses 35. As a result of the relative angular movement between the recesses of the actuating plates 20 and pressure plates 30, the balls 38 are acted upon by the converging walls of the recesses 34 and 35. The balls 38 engaged between convergent walls of the recesses 34 and 35, in the relatively moving plates 20 and 30, force the pressure plates axially against the friction disc 25, the actuating plates being incapable of axial movement and constituting abutments against which the balls 38 act to perform this function. It is to be observed that the actuation of pressure plates 30 is gradual, assuring a smooth engagement of the clutch.

In accordance with the invention, the clutch is operable to slip when the drive embodying the clutch mechanism is subjected to excessive loading. The clutch is positive in transmission of power until a predetermined or given load is imposed upon it. As described above, the actuation of the pressure plates 30 by the balls 38 co-acting with the recesses 34 and 35 is gradual and the actuating force exerted axially on the plates is proportional to the torque transmitted. However, as the transmitted torque increases in value the balls 38 approach the ends of the recesses 34 and 35. When the balls 38 reach a given position in their respective recesses, the axial force component accompanying the transmission of power through the balls is no longer sufficiently great in relation to the circumferential or angular force component to resist slippage between the plates 30 and the friction surfaces 26. The degree of flexibility of the actuating plates 20 and the initial spacing of the plates determine the extent of displacement of the balls 38 in their recesses under any given torque loading. Accordingly, the actuating plates 20 may be constructed and spaced to provide for clutch slippage at any given load. By varying the thickness of the shims 23 the clutch may be adjusted or conditioned to allow slippage upon the imposition of loads varying within a substantial range. Thus, in addition to its other characteristics and capabilities the mechanism of the invention may be considered as an adjustable or regulable overload clutch.

In the above description of normal operation where the driver 10 drives the driven element 17, it was assumed that the control ring 33 was free on the hub 12 to permit the slight lagging of the pressure plates 30 relative to the actuators 20 to produce actuation of the displacement of the balls 38 from their normally central positions in the recesses 34 and 35. Upon initiation of the normal drive from the shaft 10 to the driven flange 17, the control ring 33 and the pressure plates 30 are free to lag to a limited extent relative to the actuator plates 20, but the invention provides a control means to prevent such lagging of the pressure plates 30 in the event the flange 17, or the mechanism associated therewith, tends to drive the shaft 10 or normal driver. This control means for locking the clutch against the transmission of reverse torque, to provide for an overrunning clutch action, includes one or more radial cylinder openings 45 in the thickened peripheral portion of the hub 12. In the construction illustrated there are three equally spaced cylinder openings 45, it being understood that the number of openings may vary in different forms of the invention. The cylinder openings 45 extend inwardly from the periphery of the hub 12. A piston 46 of suitable material of relatively low specific gravity, such as micarta, is operable in each cylinder opening 45. A central boss or lug 47 projects from the outer end of each piston 46. The control ring 33 which encircles the hub 12 extends across the outer ends of the cylinder openings 45. Circumferentially extending slots 48 are formed in the control ring 33 to receive the piston lugs 47. Centrifugal force acting on the pistons 46 urges them outwardly to the positions where their lugs 47 may cooperate with the slots 48. The slots 48 are amply long to allow sufficient relative angular movement between the actuators 20 and pressure plates 30 to cause actuation of the pressure plates for the normal transmission of power from the driver 10 to the flange 17 as above described. However, the parts are formed and related so that the lugs 47 are adjacent to or in engagement with corresponding end walls of the slots 48 when the balls 38 are in their central positions in the recesses 34 and 35. The relationship of parts is such that the cooperation of the lugs 47 with these end walls of the slots 48 prevent angular displacement between the pressure plates 30 and the actuators 20 when the driven flange 17 tends to drive the engine shaft 10 as a result of engine failure or shutdown. Thus when the normally driven flange element 17 rotates with respect to the engine shaft 10, the balls 38 are maintained in their central positions in the recesses 34 and 35 and the pressure plates 30 remain unactuated so that the friction disc 25 may freely rotate between the pressure plates without transmitting torque to the hub 12 or shaft 10. From the above it will be seen that the clutch mechanism normally provides for a "free wheeling" or over-running clutch action and does not transmit reverse torque.

The invention provides a control whereby the clutch may be conditioned at the will of the operator of the mechanism or engine, for the transmission of reverse torque; that is, for the transmission of power from the driven flange 17 to the shaft 10. Radial ports 49 extend inwardly from the inner ends of the cylinder openings 45 and join an annular groove 50 formed in an inner corner of the hub 12. A diagonal port 51 leads from the manifold or the distributor groove 50 to a radial port 52 in the shaft 10. A relatively stationary ring 53 surrounds the shaft 10 and has an internal annular groove 54 carrying a sealing assembly 56 which seals with the periphery of the shaft 10. The sealing assembly 56 has an annular groove 57 which remains in communication with the radial port 52 at all times. A conduit or line 58 extends from the groove 57 to a source of negative pressure or vacuum. I have shown the line 58 extending to the intake manifold 60 of an engine for example an airplane engine. A check valve 61 is interposed in the line 58 and its ball or closure 62 is spring-urged to seal against the negative pressure in the manifold. A manually controllable or operable source of negative pressure is connected into the line 58 at a point between the check valve 61 and the ring 53 of the sealing means. The manually operable or controllable source of negative pressure may take different forms. In the drawings I have shown a manually operable vacuum pump 64 connected in the line 58 by a pipe 63. The present invention is not primarily concerned with the type of pump employed. The diagrammatically illustrated pump 64 includes a piston 65 operable in a cylinder and a handle 66 provided on the piston rod to operate the pump.

It will be assumed that the clutch mechanism is associated with an airplane engine and serves to drive a propeller. In the operation of such an installation the conventional starter, not shown, is engaged and put into operation to rotate the propeller. As the propeller comes up to speed the vacuum pump 64 is operated by its handle 66 to build up a negative pressure in the cylinders 45. The negative pressure in the cylinder openings 45 causes the pistons 46 to move inwardly and the piston lugs 47 are withdrawn from the slots 48 in the control ring 33. Upon retraction of the lugs 47 from the slots 48 the pressure plates 30 are free to be rotated slightly relative to the actuators 20 by the incidental drag between the pressure plates and the friction disc 25. The slight angular movement of the plates 30 relative to the actuators 20 displaces the recesses 35 with respect to the recesses 34 and the balls engaged in the partially displaced pairs of recesses force the pressure plates 30 against the friction disc 25 to engage the clutch. With the clutch engaged for the transmission of reverse torque the engine is turned over and will start. When the engine goes into operation the negative pressure builds up in the manifold 60 and unseats the ball 62 of the valve 61. This places the cylinder openings 45 in communication with the manifold 60 and the manifold negative pressure holds the pistons 46 retracted. When the engine throttle is opened the manifold vacuum decreases and concurrently with this decrease in negative pressure the centrifugal force on the pistons 45 increases. The centrifugal force overcomes the reduced pressure in the cylinder openings 45 and the pistons move outwardly. When the engine shaft 10 assumes its role as a driving element the relative angular displacement between the hub 12 and the control ring 33 brings the slots 48 to positions where they receive the lugs 47 of the outwardly urged pistons. As described above in connection with the normal operations of the clutch mechanism, the slight angular displacement between the actuators 20 and the pressure plates 30, caused by incidental dragging of the pressure plates against the friction disc 25, results in partial displacement of the recesses 34 and 35 so that the balls 38 actuate the pressure plates 30 axially against the friction disc 25 for the transmission of power from the driving assembly to the driven assembly. The engagement of the piston lugs 47 in their slots 48 prevents the clutch from engaging in the event the propeller tends to drive the engine. Thus if the engine dies during high speed operation it may free-wheel to a stop and the propeller will not rotate the dead engine. This overrunning action has been described in detail above. When engine speed is reduced during flight by closing the throttle, for example, when coming in for a landing, the negative pressure in the manifold 60 increases and the pistons 45 are moved inwardly to retract their lugs 47 from the slots 48. Upon disengagement of the lugs from the slots, the clutch engages for the transmission of reverse torque and the propeller drives the engine. This action of the clutch in transmitting reverse torque has been described in detail above.

It is believed that the operation of the clutch mechanism will be understood from the drawings and the foregoing detailed description. Figures 9, 10 and 11 are diagrammatic views illustrating the relationship of parts during the three conditions of normal drive, overruning clutch action and reverse torque drive respectively. Figure 9 illustrates the position of a ball 38 in its respective recesses 34 and 35 and the position of a piston lug 47 in its slot 48 when the clutch is serving to transmit power from the driver 10 to the driven element 17 during normal operation. It will be observed that the recesses 34 and 35 are partially out of alignment and that the piston lug 47 is substantially centrally disposed within its slot 48. Figure 10 shows the parts in the positions where the normally driven element 17 may "free-wheel' or overrun the normal driver. Under these conditions, the ball 38 is centrally located in its respective recesses 34 and 35 and the piston lug 47 is engaged against an end wall of its slot 48 to prevent the relative angular displacement of the pressure plates 30 and actuators 20 that is required to cause the transmission of reverse torque through the mechanism. Figure 11 shows the parts related for the transmission of reverse torque through the mechanism, that is related for the transmission of power from the normally driven flange 17 to the engine shaft 10. At this time the recesses 34 and 35 are partially out of alignment so that the ball 38 assists in actuating its pressure plate against the friction disc 25 and the piston 46 is held retracted by the negative pressure from line 58 so that its lug 47 is withdrawn from its slot 48 and is within the inner surface of the control ring 33.

Figure 13 illustrates a form of the invention employing a positive pressure actuated means for controlling the pistons 70 of the clutch mechanism. The pistons 70 operate in the cylinder openings 45 and have stems 71 extending from their heads for cooperating with the slots 48 in the control ring 33. The actuating plates 20, pressure plates 30, balls 38, control ring 33 and associated parts may be the same as described above and corresponding reference numerals are applied to the corresponding parts in the two forms of the invention. The stems 71 of the pistons 70 slidably operate in the openings of rings 72 secured in the outer ends of the cylinder openings 45. Sealing rings 73 on the pistons seal with the walls of the openings 45 and similar rings 74 on the rings 72 seal with the stems 71. The spaces between the rings 72 and the heads of the pistons 70 form pressure chambers 75. Stems 76 extend from the inner ends of the pistons 70 and slidably operate in openings 77 in the hub 12. Sealing means 78 on the stems 76 cooperate with the walls of the openings 77. An axial port 79 extends through each piston 70 to maintain the pressure chamber 75 in communication with the related opening 77. In this form of the invention where the pistons 70 are positively operated they may be formed of steel or other material of a relatively high specific gravity. Springs 80 are engaged under compression between the inner ends of the pistons 70 and the bottom walls of the cylinder openings 45 to urge the pistons outwardly so that their lugs may cooperate with the slots 48. Ports 81 in the hub 12 vent the inner ends of the cylinder openings to the atmosphere and permit the escape of any liquid that may leak past the pistons.

The control means of Figure 13 includes the diagonal port leading 51 from the groove 50, at the openings 77, to the above mentioned opening 52, which in turn, communicates with the annular groove 57 of the sealing means. A tube or line 83 extends from the groove 57 and has controlled communication with a source of fluid pressure. In the drawings this source of fluid pressure is represented as a line 84 leading from the engine oil pressure system. Communication between the pressure line 84 and the line 83 is under the control of a relay valve operated by the negative pressure in the intake manifold. The relay valve has a body 85 provided with a cylinder opening 86 and a reduced bore 87 extends from one end of the cylinder opening. The pressure line 84 communicates with the outer end of the bore 87 and the line 83 joins the bore at a point intermediate its ends. A needle or stem 88 slidably operates in the bore 87 and extends into the cylinder opening 86. A negative pressure line 89 leading from the intake manifold of the engine communicates with the outer end of the cylinder opening 86. A plunger 90 on the stem 88 operates in the cylinder opening. One side of the plunger 90 is acted on by atmospheric pressure admitted to the opening 86 by a vent port 91 and the other side of the plunger is exposed to the negative pressure of the engine manifold. A spring 92 is arranged under compression between the plunger 90 and an end wall of the opening 86 to urge the plunger to a position where the stem 88 closes off communication between the lines 84 and 83. It will be seen that when the negative pressure in the engine manifold builds up to a given value the stem 88 is moved to a position to allow free communication between the lines 83 and 84 so that oil pressure is supplied to the cylinder chambers 75.

The control means of Figure 13 further includes a manually controllable or operable fluid pressure supply means. This means may take practically any selected form. In the diagrammatic drawing I have shown a manually operable oil pump or pressure generator comprising a cylinder 93, a piston 94 in the cylinder and an operating knob 95 on the piston rod. A line 96 extends from the cylinder 93 to the line 83.

In the operation of the system shown in Figure 13 the propeller is first rotated by the starter motor and when the propeller attains the proper speed the knob 95 of the pressure developing means is pushed inwardly to provide oil pressure in the lines 83 and 96 and the cylinder chambers 75. At this time the valve stem 88 is in its closed position. The oil pressure in the chambers 75 acts against the pistons 70 and the pistons move inwardly. It is to be noted that the area of each piston 70 exposed to the oil pressure in the chambers 75 is greater than the cross sectional area of the openings 77 so that the pressure in the chambers 75 may readily move the pistons inwardly against the springs 80 and the oil pressure in the openings 77. Inward movement of the pistons 70 withdraws their stems 71 from the slots 48 to allow relative angular movement between the actuator and pressure plates 20 and 30 respectively so that the clutch is engaged for the transmission of reverse torque in the manner described in detail above. Thus the engine is turned over and started. When the engine goes into operation negative pressure builds up in the manifold and line 89 and this negative pressure moves the stem 88 of the relay valve to the open position where the line 84 communicates with the line 83. Oil pressure from the line 84 holds the several pistons 70 in their inward or retracted positions. Because of this automatic action of the relay valve it is unnecessary for the operator to maintain inward pressure of the knob 95 of the manual pressure developing means. When the engine throttle is opened, negative pressure in the intake manifold decreases and the spring 92 moves the valve stem 88 to the closed position, cutting off the oil pressure from the line 83 and the cylinder chambers 75 communicating therewith. The springs 80, aided by centrifugal force acting on the pistons 70 and by slight oil leakage at the sealing ring 53, move the pistons 70 outwardly. The lugs 71 of the outwardly moving pistons enter their respective slots 48 in the control ring 33 and angular displacement between the actuator plates 20 and the pressure plates 30 results in actuation of the plates 30 to engage the clutch for the transmission of power from the engine to the propeller. The stems 71 engaged in the slots 48 prevent the propeller from driving the engine. When the engine speed is reduced, preparatory to landing, by closing the engine throttle, the negative pressure in the intake manifold and line 89 builds up and moves the valve stem 88 to the open position. This admits oil pressure from the line 84 to the cylinder chambers 75. The oil pressure moves the pistons 70 inwardly to withdraw the stems 71 from the slots 48. When the lugs are withdrawn from the slots the clutch engages in the manner described above for the transmission of reverse torque so that the propeller may drive the engine. In this phase of operation the engine is utilized as a brake.

From the foregoing, it will be apparent that I have provided a simple dependable overrunning clutch operable, when required, to transmit power from the normally driven element to the element which normally serves as the driver. It is to be observed that while the balls and recesses 34 and 35 cooperate to transmit power between the driving assembly and the pressure plates 30 they do not serve to transmit power between the pressure plates and the friction disc 25, and therefore are not subjected to wear incident to the energy dissipation accompanying clutching and declutching. The friction disc 25, with its facings 26, and the pressure plates 30 are designed to withstand the friction and wear accompanying engagement and disengagement of the clutch and the balls and recesses are remote from and independent of the actual "clutching" between the driving and driven assemblies.

Having described only typical forms of the invention I do not wish to be limited to the specific details herein set forth, but wish to reserve to myself any variations or modifications that may appear to those skilled in the art or fall within the scope of the following claims.

I claim:

1. A clutch mechanism comprising a driving element, a driven element, friction means for transmitting rotation from one element to the other, actuating means energized by angular movement between the elements for operating the friction means, means for holding the actuating means against operation upon overrunning rotation of the driven element with respect to the driving element without interfering with operation of the actuating means produced by rotation of the driving element relative to the driven element, and fluid pressure actuated means operable at the will of the operator for rendering the last named means ineffective so that angular movement of the driven element will energize the actuating means for the transmission of rotation from the driven element to the driving element instead of overrunning the same.

2. A clutch mechanism comprising a driving element, a driven element, means operable to transmit rotation from one element to the other including friction members on the elements, one member being movable into engagement with the other for the transmission of rotation between the elements, means operable upon relative angular movement between one of said members and its respective element for moving said movable member into effective engagement with the other member, control means operable to prevent such relative angular movement in the event the driven element overruns the driving element without interfering with operation of the actuating means produced by rotation of the driving element relative to the driven element, and manually governed fluid pressure actuated means for rendering the control means ineffective so that the driven element may drive the driving element instead of overrunning the same.

3. A clutch comprising a driving element, a driven element, a friction disc on one element, a pressure plate associated with the other element for limited axial and angular movement and axially movable into power transmitting engagement with the disc, the plate having incidental engagement with the disc prior to said axial movement, means for imparting said axial movement to the plate actuated by relative angular movement between the plate and its associated element resulting from said incidental engagement, control means for preventing said relative angular movement between the plate and its associated element when the driven element is rotated relative to the driving element whereby the clutch is overrunning, and means controllable by the operator for rendering the control means ineffective so that the driven element may drive the driving element.

4. A clutch including a driving element, a driven element, a disc on the driven element, a pressure plate carried by the driving element for limited axial and angular movement, the plate having incidental engagement with the disc when in an unactuated condition, means actuated by relative angular movement between the driving element and the plate, resulting from said incidental engagement, upon relative rotation between the elements for imparting axial movement to the plate to bring it into power transmitting engagement with the disc, control means for preventing said relative angular movement when the driven element rotates with respect to the driving element so that the clutch overruns, and means under the control of the operator for holding the control means ineffective so that the driven element may drive the driving element.

5. A clutch including a driving element, a driven element, a disc on the driven element, a pressure plate carried by the driving element for limited axial and angular movement, the plate having incidental engagement with the disc when in an unactuated condition, said incidental engagement causing relative angular movement between the plate and driving element upon the initiation of rotation of an element, and means actuated by said relative angular movement between the plate and driving element for moving the plate axially into power transmitting engagement with the disc, said means including abutment surfaces on the driving element and plate, and a member engaged between the surfaces.

6. A clutch including a driving element, a driven element, a disc on the driven element, a pressure plate carried by the driving element for limited axial and angular movement, the plate having incidental engagement with the disc when in an unactuated condition, said incidental engagement causing relative angular movement between the plate and driving element upon the initiation of rotation of an element, and means actuated by said relative angular movement between the plate and driving element for moving the plate axially into power transmitting engagement with the disc, said means including an abutment member on the driving element, the abutment member and plate having opposing recesses, the walls of the recesses converging in a circumferential direction, and balls engaged in the recesses to ride along said walls.

7. A clutch including a driving element, a driven element, a disc on the driven element, a pressure plate carried by the driving element, a pressure plate carried by the driving element for limited axial and angular movement, the plate having incidental engagement with the disc when in an unactuated condition, said incidental engagement causing relative angular movement between the plate and driving element when an element begins to turn, means actuated by said relative angular movement for moving the plate axially into power transmitting engagement with the disc, said means including opposing surfaces on the plate and driving element converging toward one another in both directions circumferentially of the clutch assembly, and balls engaged between said surfaces, control means operable to prevent said relative angular movement between the plate and driving element when the driven element rotates relative to the driving element whereby the clutch is overrunning, and manually conditioned means for rendering the control means ineffective so that the clutch may transmit power from the driven element to the drive element.

8. A clutch including a driving element, a driven element, a disc on the driven element, a pressure plate carried by the driving element for limited axial and angular movement, the plate having incidental engagement with the disc when in an unactuated condition, said incidental engagement causing relative angular movement between the plate and driving element when an element begins to turn, means actuated by said relative angular movement for moving the plate axially into power transmitting engagement with the disc, said means including opposing surfaces on the plate and driving element converging toward one another in both directions circumferentially of the clutch assembly, and balls engaged between said surfaces, control means operable to prevent said relative angular movement between the plate and driving element when the driven element rotates relative to the driving element whereby the clutch is overrunning, and fluid pressure actuated means for rendering the control means ineffective so that the clutch may transmit power from the driven element to the drive element.

9. A clutch including a driving element, a driven element, a disc on the driven element, a pressure plate carried by the driving element for limited axial and angular movement, the plate having incidental engagement with the disc when in an unactuated condition, said incidental engagement causing relative angular movement between the plate and driving element when an element begins to turn, means actuated by said relative angular movement for moving the plate axially into power transmitting engagement with the disc, said means including opposing surfaces on the plate and driving element converging toward one another in both directions circumferentially of the clutch assembly, and balls engaged between said surfaces, cylinder and piston means for holding the plate against angular movement relative to the driving element when the driven element is rotated relative to the drive element, and a control for the cylinder and piston means operable to render the same ineffective whereby the clutch may transmit power from the driven element to the drive element.

10. A clutch including a driving element, a driven element, a disc on the driven element, a pressure plate carried by the driving element for limited axial and angular movement, the plate having incidental engagement with the disc when in an unactuated condition, means actuated by relative angular movement between the driving element and the plate, resulting from said incidental engagement, upon relative rotation between the elements for imparting axial movement to the plate to bring it into power transmitting engagement with the disc, pistons carried by the drive element for preventing said relative angular movement when the driven element rotates relative to the drive element, and fluid pressure means operable to retract the pistons to free the plate for said relative angular movement so that the clutch may transmit power from the driven element to the drive element.

11. A clutch comprising a drive element, a driven element, a friction disc on the driven element, pressure plates movable axially into power transmitting engagement with the disc, the plates having slight dragging engagement with the disc when unactuated, actuator plates on the drive element, the pressure plates and actuator plates having aligned pairs of depressions which are of maximum depth at their medial portions and which diminish in depth circumferentially toward their ends, and balls in the pairs of depressions, the balls occupying said medial portions of the depressions when the pressure plates are unactuated and riding into the diminishing portions of the depressions to move the pressure plates into power transmitting engagement with the disc when said dragging engagement of the pressure plates with the disc, accompanying relative rotation between the elements, produces relative angular movement between the pressure plates and driving elements.

12. A clutch comprising a drive element, a driven element, a friction disc on the driven element, pressure plates movable axially into power transmitting engagement with the disc, the plates having slight dragging engagement with the disc when unactuated, actuator plates on the drive element, the pressure plates and actuator plates having aligned pairs of depressions which are of maximum depth at their medial portions and which diminish in depth circumferentially toward their ends, balls in the pairs of depressions, the balls occupying said medial portions of the depressions when the pressure plates are unactuated and riding into the diminishing portions of the depressions to move the pressure plates into power transmitting engagement with the disc when said dragging engagement of the pressure plates with the disc, accompanying relative rotation between the elements, produces relative angular movement between the pressure plates and driving element, and control means for preventing said relative angular movement between the pressure plates and driving element when the driven element rotates relative to the driving element.

13. A clutch comprising a drive element, a driven element, a friction disc on the driven element, pressure plates movable axially into power transmitting engagement with the disc, the plates having slight dragging engagement with the disc when unactuated, actuator plates on the drive element, the pressure plates and actuator plates having aligned pairs of depressions which are of maximum depth at their medial portions and which diminish in depth circumferentially toward their ends, balls in the pairs of depressions, the balls occupying said medial portions of the depressions when the pressure plates are unactuated and riding into the diminishing portions of the depressions to move the pressure plates into power transmitting engagement with the disc when said dragging engagement of the pressure plates with the disc, accompanying relative rotation between the elements, produces relative angular movement between the pressure plates and driving element, and control means for preventing said relative angular movement between the pressure plates and driving element when the driven element rotates relative to the driving element, the control means including a ring splined to the pressure plates to allow axial movement thereof and related to the driving element for relative angular movement, and a lug and slot connection between the ring and driving element preventing relative angular movement between the ring and driving element when the driven element rotates relative to the driving element.

14. A clutch including a driving element, a driven element, a disc on the driven element, a pressure plate carried by the driving element for limited axial and angular movement, the plate having incidental engagement with the disc when in an unactuated condition, said incidental engagement causing relative angular movement between the plate and driving element upon the initiation of rotation of an element, and means actuated by said relative angular movement between the plate and driving element for moving the plate axially into power transmitting engagement with the disc, said means including an abutment member on the driving element, the abutment member and plate having opposing recesses, the walls of the recesses converging in a circumferential direction, and balls engaged in the grooves to ride along said walls, the abutment member being flexible to allow slippage between the disc and plate when the balls are forced to given positions on said walls by reason of overloading of the clutch.

15. A clutch including a driving element, a driven element, a disc on the driven element, a pressure plate carried by the driving element for limited axial and angular movement, the plate having incidental engagement with the disc when in an unactuated condition, said incidental engagement causing relative angular movement between the plate and driving element upon the initiation of rotation of an element, and means actuated by said relative angular movement between the plate and driving element for moving the plate axially into power transmitting engagement with the disc, said means including an abutment member on the driving element, the abutment member and plate having opposing recesses, the walls of the recesses converging in a circumferential direction, and means for varying the spacing of the abutment member from the disc so that the balls may assume positions on said walls to allow slippage of the clutch upon imposing predetermined torque loads in the clutch.

16. A clutch for connecting a driven element and the shaft of an engine, the engine having an intake manifold, the clutch comprising means operable to transmit rotation between the shaft and said element, means tending to operate the first named means upon relative rotation between the shaft and element, control means for preventing operation of the actuating means upon overrunning rotation of the driven element relative to the shaft, and means responsive to pressure conditions in the manifold for rendering the control means ineffective whereby the driven element may drive the shaft instead of overrunning the shaft.

17. A clutch for connecting a driven element and the shaft of an engine, the engine having an intake manifold, the clutch comprising means operable to transmit rotation between the shaft and said element, means tending to operate the first named means upon relative rotation between the shaft and element, control means for preventing operation of the actuating means upon overrunning rotation of the driven element relative to the shaft, manually operated means for rendering the control means ineffective so that the driven element may rotate the shaft, and means responsive to pressure conditions in the manifold for rendering the control means ineffective whereby the driven element may drive the shaft instead of overrunning the shaft.

18. A clutch to be interposed between a driven element and the shaft of an engine, the engine having an intake manifold and a fluid pressure source, the clutch including means operable to transmit rotation between the shaft and said element, means for actuating the first named means upon overrunning rotation of the element relative to the shaft, control means for preventing operation of the actuating means when said element rotates relative to the shaft, and means operable by pressure from said source, under the control of pressure conditions in said manifold, for rendering the control means ineffective so that the driven element may drive the shaft instead of overrunning the shaft.

19. A clutch to be interposed between a driven element and the shaft of an engine, the engine having an intake manifold and a fluid pressure source, the clutch including means operable to transmit rotation between the shaft and said element, means for actuating the first named means upon overrunning rotation of the element relative to the shaft, control means for preventing operation of the actuating means when said element rotates relative to the shaft, means operable by pressure from said source for rendering the control means ineffective so that the driven element may drive the shaft instead of overrunning the shaft, and means responsive to pressure conditions in said manifold for controlling the last named means.

20. A clutch to be interposed between a driven element and the shaft of an engine, the engine having an intake manifold and a fluid pressure source, the clutch including means operable to transmit rotation between the shaft and said element, means for actuating the first named means upon overrunning rotation of the element relative to the shaft, control means for preventing operation of the actuating means when said element rotates relative to the shaft, means operable by pressure from said source for rendering the control ineffective so that said element may drive the shaft instead of overrunning the shaft, and a relay valve responsive to pressure conditions in the manifold for initiating and terminating operation of the last named means.

21. A clutch to be interposed between a driven element and the shaft of an engine, the engine having an intake manifold and a fluid pressure source, the clutch including means operable to transmit rotation between the shaft and said element, means for actuating the first named means upon overrunning rotation of the element relative to the shaft, control means for preventing operation of the actuating means when said element rotates relative to the shaft, manually operable means for rendering the control means ineffective so that said element may drive the shaft, means operable by fluid pressure from said source for rendering the control ineffective, and means responsive to pressure conditions in said manifold for controlling the last named means.

22. A clutch including a driving element, a driven element, a disc on the driven element, a pressure plate carried by the driving element for limited axial and angular movement, the plate having incidental engagement with the disc when in an unactuated condition, said incidental engagement causing relative angular movement between the plate and driving element upon the initiation of rotation of an element, and means actuated by said relative angular movement between the plate and driving element for moving the plate axially into power transmitting engagement with the disc, said means including an abutment member on the driving element, the abutment member and plate having opposing recesses, the walls of the recesses converging in a circumferential direction, the abutment member being flexible to allow slippage between the disc and plate when the balls are forced to given positions on said walls, and means for varying the spacing of the abutment member from the disc so that the balls may assume said positions upon imposing predetermined loads on the clutch.

JOHN J. BLOOMFIELD.

REFERENCES CITED

The following references are of record in the file of this patent:

UNITED STATES PATENTS

| Number | Name | Date |
|---|---|---|
| 708,579 | Nutry | Sept. 9, 1902 |
| 1,163,803 | Bickford | Dec. 14, 1915 |
| 1,424,542 | Williams | Aug. 1, 1922 |
| 1,867,938 | Dalton | July 19, 1932 |
| 2,124,097 | Wolfram | July 19, 1938 |
| 2,221,399 | Geyer | Nov. 12, 1940 |
| 2,351,996 | Morgan | June 20, 1944 |

FOREIGN PATENTS

| Number | Country | Date |
|---|---|---|
| 492,587 | Great Britain | Sept. 22, 1938 |